(12) United States Patent
Feldpausch

(10) Patent No.: US 7,106,759 B1
(45) Date of Patent: Sep. 12, 2006

(54) NETWORK TIMING REFERENCE FOR AN INTEGRATED SERVICES HUB

(75) Inventor: Paul Feldpausch, Fowler, MI (US)

(73) Assignee: Sprint Communications Company L.P., Overland Park, KS (US)

( * ) Notice: Subject to any disclaimer, the term of this patent is extended or adjusted under 35 U.S.C. 154(b) by 1015 days.

(21) Appl. No.: 10/109,483

(22) Filed: Mar. 28, 2002

Related U.S. Application Data

(63) Continuation-in-part of application No. 09/687,683, filed on Oct. 12, 2000, now Pat. No. 6,952,399.

(51) Int. Cl.
*H04J 3/06* (2006.01)

(52) U.S. Cl. ............... 370/516; 370/369; 375/222; 375/294

(58) Field of Classification Search ........... 370/487, 370/503, 516, 369; 375/222, 294, 376; 327/159
See application file for complete search history.

(56) References Cited

U.S. PATENT DOCUMENTS

| | | | | |
|---|---|---|---|---|
| 2,041,765 A | | 5/1936 | Howell | 118/301 |
| 3,424,129 A | | 1/1969 | Peeps et al. | 118/314 |
| 3,885,066 A | | 5/1975 | Schwenninger | 427/314 |
| 3,964,432 A | | 6/1976 | Schwenninger | 118/314 |
| 4,197,344 A | | 4/1980 | Tshudy | 427/314 |
| 4,425,869 A | | 1/1984 | Hull | 118/314 |
| 4,503,086 A | | 3/1985 | Schultz | 427/510 |
| 4,808,937 A | * | 2/1989 | Correa et al. | 327/159 |
| 4,857,676 A | | 8/1989 | Garner et al. | 178/45 |
| 4,913,930 A | | 4/1990 | Getson | 438/127 |
| 5,225,170 A | | 7/1993 | Kolk et al. | 422/186.3 |
| 5,669,974 A | | 9/1997 | Cueller et al. | 118/686 |
| 5,719,872 A | * | 2/1998 | Dubberly et al. | 370/487 |
| 5,881,142 A | | 3/1999 | Frankel et al. | 379/167.02 |
| 5,963,620 A | | 10/1999 | Frankel et al. | 379/93.05 |
| 6,075,784 A | | 6/2000 | Frankel et al. | 370/356 |
| 6,141,339 A | | 10/2000 | Kaplan et al. | 370/395.61 |
| 6,223,453 B1 | | 5/2001 | Matheson et al. | 34/276 |
| 6,603,808 B1 | * | 8/2003 | Anne et al. | 375/222 |

OTHER PUBLICATIONS

U.S. Appl. No. 09/197,044, filed Nov. 20, 1998, Way, et al.
U.S. Appl. No. 09/226,575, filed Jan. 7, 1999, Rush, et al.
U.S. Appl. No. 09/650,985, filed Aug. 30, 2000, Kaplan, et al.
U.S. Appl. No. 09/650,560, filed Aug. 30, 2000, Kaplan, et al.
U.S. Appl. No. 09/653,105, filed Aug. 31, 2000, Dale, et al.
U.S. Appl. No. 09/675,585, filed Sep. 29, 2000, Goodrich.
U.S. Appl. No. 09/687,683, filed Oct. 12, 2000, Bayerl, et al.

(Continued)

*Primary Examiner*—John Pezzlo

(57) ABSTRACT

A method and apparatus for synchronizing the sampling rate of digital cells in an integrated services hub. A timing signal is extracted from an asymmetric digital subscriber line. A phase-locked loop modifies the frequency of the extracted signal and generates an adjusted timing signal. The frequency of the adjusted timing signal is compared to a predetermined value. If the frequency of the adjusted timing signal falls within a predetermined range around the predetermined value, the adjusted timing signal is used to synchronize the rate of data transfer. Otherwise, a fallback timing signal is used for synchronization. When the fallback timing signal is used, the synchronization can be improved through the use of a buffering system in which the data transfer rate is adjusted based on the amount of data in a buffer block.

14 Claims, 5 Drawing Sheets

OTHER PUBLICATIONS

U.S. Appl. No. 09/689,365, filed Oct. 12, 2000, Goodrich.
U.S. Appl. No. 09/702,933, filed Oct. 31, 2000, Mahaney.
U.S. Appl. No. 09/711,113, filed Nov. 9, 2000, Goodrich, et al.
U.S. Appl. No. 09/727,201, filed Nov. 30, 2000, Mahaney, et al.
U.S. Appl. No. 09/745,919, filed Dec. 21, 2000, Bayerl, et al.
U.S. Appl. No. 09/745,000, filed Dec. 21, 2000, Bayerl, et al.
U.S. Appl. No. 09/747,907, filed Dec. 22, 2000, Barrow.
U.S. Appl. No. 09/751,778, filed Dec. 29, 2000, Lawitzke.
U.S. Appl. No. 09/998,419, filed Nov. 29, 2001, Barrow.
U.S. Appl. No. 10/086,099, Feb. 28, 2002, Barrow, et al.
U.S. Appl. No. 10/086,101, filed Feb. 28, 2002, Bayerl, et al.
U.S. Appl. No. 10/085,942, filed Feb. 28, 2002, Leedy.

* cited by examiner

NETWORK TIMING REFERENCE FOR AN INTEGRATED SERVICES HUB

CROSS-REFERENCE TO RELATED APPLICATIONS

This application is a continuation-in-part of U.S. patent application Ser. No. 09/687,683, filed on Oct. 12, 2000 now U.S. Pat. No. 6,952,399.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to an integrated services hub (ISH) for use with broadband packet networks, and more specifically it relates to a method and apparatus for synchronizing the coding and decoding of information transmitted across an asynchronous transfer mode (ATM) network connection by synchronizing the sampling clocks through the use of a timing reference signal generated by the modification of a clock signal extracted from an asymmetric digital subscriber line (ADSL).

BACKGROUND OF THE INVENTION

Traditionally, telephony communications within the United States were handled by the public switched telecommunications network (PSTN). The PSTN can be characterized as a network designed for voice communications, primarily on a circuit-switched basis, with full interconnection among individual networks. The PSTN network is largely analog at the local loop level, digital at the backbone level, and generally provisioned on a wireline, rather than a wireless, basis. The PSTN includes switches that route communications between end users. Circuit switches are the devices that establish connectivity between circuits through an internal switching matrix. Circuit switches set connections between circuits through the establishment of a talk path or transmission path. The connection and the associated bandwidth are provided temporarily, continuously, and exclusively for the duration of the session, or call. While developed to support voice communications, circuit switches can support any form of information transfer (e.g., data and video communications).

In a traditional PSTN environment, circuit switches include central office (CO) exchanges, tandem exchanges, access tandem exchanges, and international gateway facilities. Central offices, also known as exchanges, provide local access services to end users via local loop connections within a relatively small area of geography known as an exchange area. In other words, the CO provides the ability for a subscriber within that neighborhood to connect to another subscriber within that neighborhood. Central offices, also known as end offices, reside at the terminal ends of the network. In other words, COs are the first point of entry into the PSTN and the last point of exit. They are also known as class 5 offices, the lowest class in the switching hierarchy. A class 5 telephone switch communicates with an analog telephone using the analog telephony signals in the well-known analog format. The class 5 telephone switch provides power to the telephone; detects off-hook status of the telephone and provides a dial tone in response; detects dual-tone multi-frequency signals from the caller and initiates a call in the network; plays a ringback tone to the caller when the far-end telephone is ringing; plays a busy tone to the caller when the far-end telephone is busy; provides ring current to the telephone on incoming calls; and provides traditional telephone services such as call waiting, call forwarding, caller ID, etc.

Referring to FIG. 1, a first local exchange (i.e., central office) 100 and a second local exchange 200 are connected by PSTN network 150. When placing a telephone call from the first local exchange 100 (i.e., the originating end of the network connection) to the second local exchange (i.e., the receiving end of the network connection), analog signals generated by telephone 115 are converted by local exchange 100 into digital signals for transmission over the digital backbone of the PSTN network 150. Likewise, digital signals received over the digital backbone of the PSTN network 150 are converted by local exchange 200 into analog signal for transmission to telephone 215. The conversion of analog signals to digital signals (as depicted in boxes 112 and 212) is also referred to as coding, and the conversion of digital signals to analog signals (as depicted in boxes 113 and 213) is referred to as decoding. Coding and decoding are also referred to as sampling. The equipment used to convert analog to digital (and vice-versa) is commonly referred to as a CODEC, identified by reference numeral 114 and 214. In a PSTN, CODECs typically reside on line cards within the central office. CODECs 114 and 214 convert analog signals to fixed-rate digital samples, and thus a sampling clock (identified by reference numerals 116 and 216) is required at both the transmitting and receiving end of the network (i.e., the network endpoints) in order to synchronize the coding and decoding of the digital data stream by the CODECs. Once a network connection is established, both the end of the network from which the call is originating (i.e., the originating end) and the end of the network which receives the call (i.e., the target end) transmit and receive data across the network in order for a contemporaneous conversation to occur. Thus, it is important to synchronize the sampling clocks (which control the sampling rate of the CODECs) so that an exact number of samples are transmitted and received by the network endpoints over a given time interval. If the sampling clocks are not synchronized, a frequency offset (i.e., error) will occur between the network endpoints, resulting in overflows or underflows (i.e., timing slips) of samples at the network endpoints. These timing slips reduce the quality of voice transmission and are particularly disruptive and troublesome to data transmission, where error tolerance is extremely tight. In a PSTN network, timing slips are prevented by synchronizing sampling clocks 116 and 216 to an embedded reference sample clock (represented by reference numeral 117) that is extractable from the first layer physical interface of the PSTN, which is typically a T1 or SONET OC3 fiber optic interface.

In an effort to increase the amount and speed of information transmitted across networks, the telecommunications industry is shifting toward broadband packet networks which are designed to carry a variety of services such as voice, data, and video. For example, asynchronous transfer mode (ATM) networks have been developed to provide broadband transport and switching capability between local area networks (LANs) and wide area networks (WANs). The Sprint ION network is a broadband network that is capable of delivering a variety of services such as voice, data, and video to an end user at a residential or business location. The Sprint ION network has a wide area IP/ATM or ATM backbone that is connected to a plurality of local loops via multiplexors. Each local loop carries ATM over ADSL (asymmetric digital subscriber line) traffic to an integrated service hub (ISH), which may be at either a residential or a business location.

An ISH is a hardware component that links business or residential user devices such as telephones and computers to the broadband, wide area network through a plurality of user interfaces and at least one network interface. A suitable ISH is described in U.S. Pat. No. 6,272,553 entitled "Multi-Services Communications Device," issued on Aug. 7, 2001, which is incorporated by reference herein in its entirety. The network interface typically is a broadband network interface such as ADSL, T1, or HDSL-2. Examples of user interfaces include telephone interfaces such as plain old telephone system (POTS) ports (also referred to as jacks) for connecting telephones, fax machines, modems, and the like to the ISH; computer interfaces such as ethernet ports for connecting computers and local area networks to the ISH; and video ports such as RCA jacks for connecting video players, recorders, monitors, and the like to the ISH.

In providing telephony services over a broadband network, the ISH communicates with a service manager. This connection between the ISH and the network element is typically an ATM connection, which is much different from the traditional analog line to the local switch. ATM connections usually do not support analog telephony signals, such as off-hook, dial tone, and busy signals. Therefore, the ISH must provide many of the telephony functions traditionally provided by the telephone provider central office such as detecting off-hook and on-hook connections as well as providing the telephones with dial tone, ring voltage (sometimes referred to as ring current), ringback, and busy signals. The terms off-hook and off-hook condition as used herein are generic terms meaning that a user device (whether telephone, facsimile machine, modem, etc.) connected to a telephone line is attempting to access and use the line.

Another example of such a central office function being provided by the ISH is the coding and decoding of analog and digital signals. As shown in FIG. 2, ATM network 175 comprises a first endpoint 300 and a second endpoint 400. In an ATM network, endpoints 300 and 400 typically each comprise an ISH (reference numerals 310 and 410) connecting telephones 315 and 415 to ATM network 175. The coding and decoding functions are provided by CODECs 314 and 414 residing within integrated services hubs 310 and 410, respectively. Integrated services hubs 310 and 410 each contain a sampling clock (reference numerals 316 and 416, respectively) that controls the rate of sampling by the CODEC. Sampling clocks 316 and 416, residing at the endpoints of the network connection, need to be synchronized in order to prevent timing slips. Unfortunately, many newer ATM and other broadband packet networks do not currently support an embedded reference sample clock, and thus there is no common reference clock for the endpoint sampling clocks to extract and synchronize upon.

As shown in FIG. 2, one solution is to use local sampling clocks 316 and 416 that are close but not exactly equal at each endpoint. The drawback to this solution is that since the local sampling clocks are not synchronized, frequency offset or errors will occur between endpoints, resulting in reduced quality from underflows or overflows (i.e., timing slips) of samples at both endpoints. Using highly accurate clocks at the endpoints can minimize the frequency offset, but this is typically cost prohibitive, especially in an ISH that must be distributed to a large number of customers.

A variation of this solution, as shown in FIG. 3, involves extracting from the network connection a reference sampling rate representing the rate of sampling occurring at the end of the network connection opposite from the end connected to the integrated services hub and adjusting the sampling rate in the integrated services hub to about equal the reference sampling rate. The reference sampling rate may be an embedded signal, but preferably is extrapolated from the arrival rate of incoming cells to the integrated services hub. Extrapolation is achieved by monitoring the fill level of incoming cells received into an incoming cell buffer, increasing the sampling rate in the integrated service hub in response to an increase in the fill level of the incoming cell buffer above the midpoint, and decreasing the sampling rate in the integrated services hub in response to a decrease in the fill level of the incoming cell buffer below the midpoint.

SUMMARY OF THE INVENTION

The present invention discloses a method and apparatus for synchronizing the sampling rate of digital cells in an integrated services hub. A timing signal is extracted from an asymmetric digital subscriber (ADSL) line. A phase-locked loop is used to modify the frequency of the signal extracted from the ADSL line and generate an adjusted timing signal. The frequency of the adjusted timing signal is compared to a predetermined value. If the frequency of the adjusted timing signal falls within a predetermined range around the predetermined value, the adjusted timing signal is used to synchronize the rate of data transfer. If the frequency of the adjusted timing signal falls outside the predetermined range around the predetermined value, an internal clock signal is used to synchronize the rate of data transfer.

When the internal clock is used as the reference timing signal, its frequency can be adjusted by monitoring the fill level of incoming cells received into an incoming cell buffer. The frequency of the internal clock signal can be increased in response to an increase in the fill level of the incoming cell buffer above the midpoint and decreased in response to a decrease in the fill level of the incoming cell buffer below the midpoint.

DETAILED DESCRIPTION OF THE PREFERRED EMBODIMENTS

Figure 4:
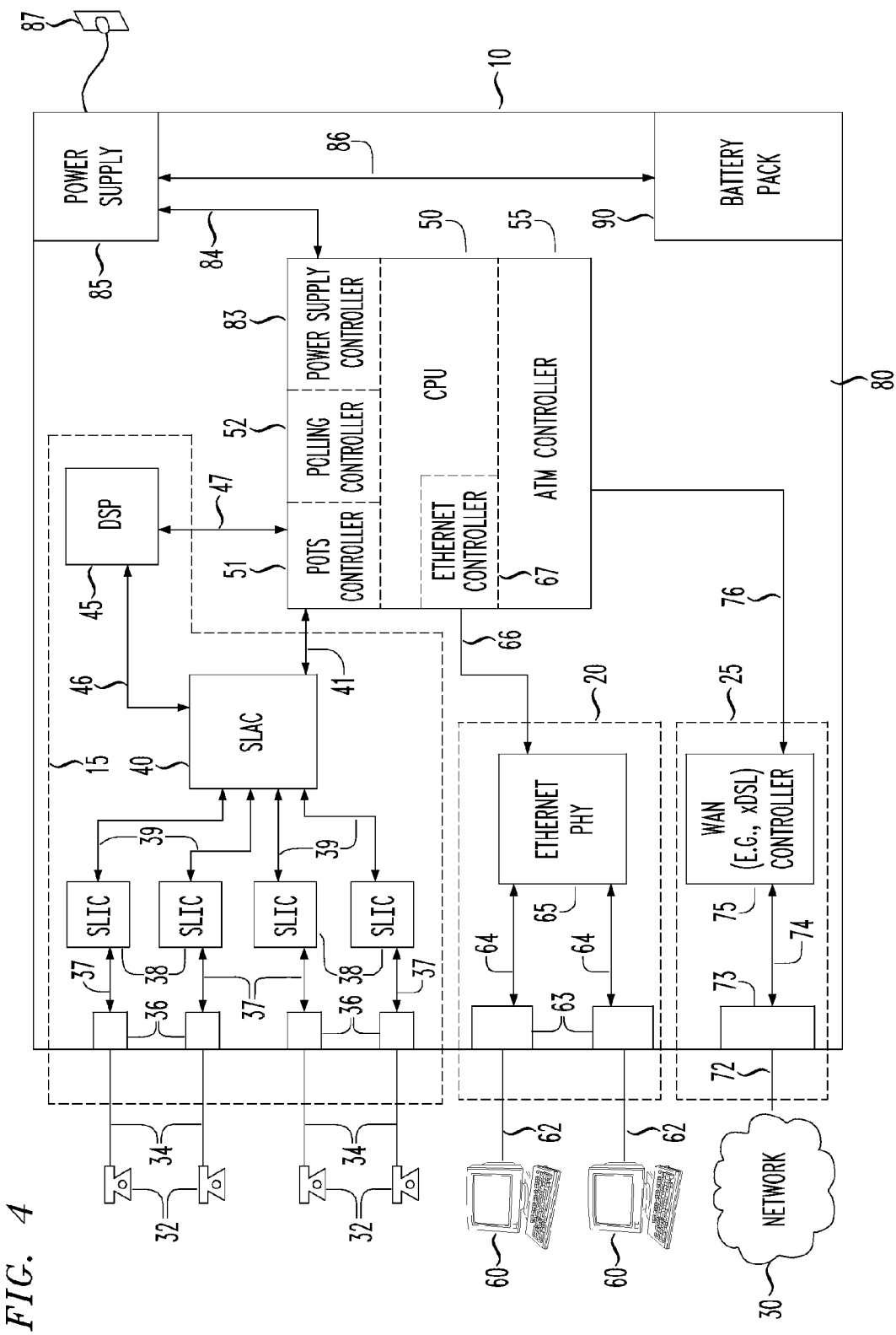
FIG. 4 is a block diagram of an integrated services hub (ISH) useful in carrying out the invention.

Referring to FIG. 4, integrated services hub (ISH) 10 comprises plain old telephone system (POTS) interface 15, local area network (LAN) interface 20, and wide area network (WAN) interface 25. POTS interface 15 and LAN interface 20 provide user interfaces for the ISH. WAN interface 25 provides the ISH with an interface to a wide area network 30, preferably a broadband packet network such as Sprint's ION network. In describing the ISH, the components are generally described in carrying out the appropriate function to transmit data from the user interfaces to the WAN, and it should be understood that these components in general perform the reverse function when receiving data from the WAN and transmitting it to the user interfaces.

Telephones 32 are connected by telephone lines 34 to POTS interface 15 by telephone jacks 36, for example industry standard RJ-11 or RJ-14 jacks. As used herein telephone generally refers to a device, a portion of which is typically handheld, for converting sound to electrical signals and vice-versa and further comprising a ringer that rings in response to a ring current, provided however that telephone should also be understood to include any device that responds to telephony signals such as a facsimile machine, modem, or computer. Telephones typically use the analog telephony format. Digital format telephones could also be used, with the understanding that the specific support circuitry in the ISH would change while providing equivalent functions (for example, detecting hook transitions).

Telephone line 34 is the physical connection connecting the telephone to a connector (i.e., jack 36) on the ISH and may be any medium operational to carry telephony signals, typically twisted pairs of copper wires. The telephone line carries electrical signals and ring current from the ISH to one or more telephones connected to the telephone line. Telephone circuit refers to the telephony signal loop formed by the connection of one or more telephones to a POTS port on the ISH via a telephone line.

POTS interface 15 typically comprises a plurality of telephone circuits. While four telephone circuits (corresponding to four telephones 32 connected by four telephone lines 34 to four jacks 36) are shown in FIG. 4, any desirable number of telephone circuits may be employed provided that the equipment is appropriately sized to accommodate that number. As noted previously, more than one telephone may be connected to a telephone circuit.

POTS interface 15 further comprises subscriber line interface circuits (SLICs) 38, subscriber line access circuit (SLAC) 40, and digital signal processor (DSP) 45. In the preferred embodiment of FIG. 4, SLICs 38 are connected to telephone jacks 36 by connections 37 on a one-to-one basis. In other words, each telephone circuit (and its corresponding jack, telephone line, and one or more telephones) has a separate and corresponding SLIC. Alternatively, SLICs may incorporate more than one channel each, that is to say a SLIC may be connected to more than one telephone circuit. The SLICs convert relatively high power, two-line analog signals (also referred to as a tip and ring telephone circuit) received from the telephone into relatively low power, four-line analog signals (also referred to as a transmit signal circuit and a receive signal circuit). Furthermore, the SLIC serves as the amplifier that drives power (i.e., voltage and current) onto its corresponding telephone line. Examples of suitable SLICs are integrated circuit chip numbers AM79R79 and AM79R241 produced by Legerity, Inc., the former Communications Products Division of Advanced Micro Devices (AMD), Inc.

SLAC 40 is connected to SLICs 38 by connections 39. Generally, a SLAC performs three functions: line supervision, signal filtering and manipulation, and analog/digital conversions. The SLAC supervises the lines (and the SLIC corresponding to each line), which includes execution of various protocols for detecting and recognizing an off-hook condition. While the embodiment shown in FIG. 4 uses a SLAC to perform line supervision, SLICs are available that perform line supervision functions, and such enhanced SLICs having integral hook transition monitoring capability could be used in carrying out the invention. Signal filtering and manipulation is used to conform signals to various industrial or regional/national telephony standards. The SLAC converts four-line analog signals received from the SLICs into four-line digital signals. Thus, the SLAC is an analog to digital (A/D) and digital to analog (D/A) converter, which is also referred to respectively as coding and decoding (i.e., a CODEC). Preferably, the SLAC codes and decodes in compliance with the International Telecommunications Union (ITU) G.711 standard. Typically, a SLAC manages a fixed number of SLICs, and thus the number of SLACs is determined by the number of SLICs. Examples of suitable SLACs are integrated circuit chip numbers AM79Q021 and AM79Q2243 produced by Legerity, Inc., the former Communications Products Division of Advanced Micro Devices (AMD), Inc., which are each quad-devices designed to manage four SLICs.

SLAC 40 transmits and receives control data such as line status and signaling to the central processing unit (CPU) 50 by connection 41. The CPU (commonly referred to as a microprocessor) controls the overall function of the ISH and has initialization, management, configuration, and control responsibilities for all of the components and interfaces comprising the ISH. CPU 50 contains control software, which is stored in memory (for example, flash memory), and the control software is executed by the CPU. Upon execution of the control software, the CPU interacts with various memory mapped peripherals (for example, WAN interface 25). The CPU control software includes a) a POTS control module 51 that controls the telephony functions during operation of the ISH under primary power; b) a polling control module 52 that controls the POTS telephony functions when primary power fails; c) a AC power supply control module 83 which monitors, either continuously or periodically, the AC power supply; and d) ATM control module 55 that controls the communications with the network. An example of a suitable CPU is integrated circuit chip number MPC8260 Power QUICC II Communications Processor produced by Motorola, Inc.

Digital signal processor (DSP) 45 compresses (i.e., packetizes) data, typically voice data, received from SLAC 40 by connection 46. DSP 45 transmits compressed data to CPU 50 via connection 47 for transmission to network 30 by ATM control module 55. An example of a suitable DSP is integrated circuit chip number TMS320VC5402 produced by Texas Instruments, Inc. ATM control module 55 provides the ATM and AAL (ATM adaptation layer) layers of the ATM Protocol, which are necessary for ATM-formatted communications with network 30. In a preferred embodiment, ATM control module 55 is a combination of hardware and software on CPU 50.

Computers 60 are connected by connections 62 to LAN interface 20 by LAN connectors 63. LAN connectors 63 are preferably RJ-45 jacks, but any suitable computer connection means may be employed, for example a universal serial bus (USB). While two computers are shown in FIG. 4, any desirable number of computers may be employed provided that the equipment is appropriately sized to accommodate that number.

LAN interface 20 further comprises a LAN physical layer (PHY) device 65 connected to LAN connectors 63 by connections 64. LAN PHY device 65 is preferably an ethernet PHY, and more specifically an MII transceiver. CPU 50 contains an ethernet control module 67, which serves as a media access control (MAC) device and is connected to LAN PHY device 65 by connection 66. The ethernet PHY and MAC devices support a 10/100 Mbit industry standard MII ethernet connection.

Network 30 is connected by connection 72 to WAN interface 25 by WAN connector 73. WAN connector 73 is preferably an RJ-11 jack for ADSL. WAN interface 25 is preferably a universal, xDSL interface, and more preferably an ATM over ADSL interface. xDSL is a generic term encompassing all known varieties of digital subscriber lines (DSL) such as ADSL, U-ADSL, SDSL, HDSL2, RADSL, etc. Other types of WAN interfaces could be used such as T1, cable modem, wireless broadband modem, or ATM-25.

WAN interface 25 further comprises WAN controller 75 connected to WAN connector 73 by connection 74. WAN controller 75 is connected to ATM control module 55 by connection 76. WAN controller 75 is preferably Globespan's G7000 multimode chip set, which further comprises an analog front end (AFE) chip (Globespan GT3180) and a multimode xDSL downloadable DSP and framer chip (Globespan GS7070). The AFE chip provides analog to digital and digital to analog signal conversions. The DSP and framer chip provides digital signal processing and signal transmission framing functions.

POTS interface 15, LAN interface 20, WAN interface 25, CPU 50, and ATM controller 55 are mounted on motherboard 80, which is a printed circuit board (also referred to as a logic board) that provides the various connections between ISH components as discussed above. The motherboard may include expansion slots to accept expansion cards such as an additional POTS card, an ATM-25 interface, a cable modem, etc. Motherboard 80 is connected to AC power supply 85 and battery pack 90, thereby providing power to the ISH components, the attached analog telephones, and the battery monitoring and charge circuitry. CPU 50 contains AC power supply control module 83 connected to AC power supply 85 by connection 84. A preferred AC power supply is a universal-input (40–400 Hz, 90–270V AC RMS) switchmode lead/acid battery float charger with a current-limited output of nominally 13.8 V, and provides charging current to battery pack 90 as represented by connection 86. A preferred battery is a 12 volt DC, 2.5A gel cell (lead-acid) battery, and preferably battery pack 90 comprises two such batteries housed within the ISH.

The AC power supply is plugged into a standard electrical outlet 87 and serves as the primary power source for the ISH. In the event of a power failure to the electrical outlet, the ISH operates under backup power provided by its battery pack and basic telephone services remain available to the customer for emergency calls. Given that the ISH requires power in order to provide basic telephone service, it is important to reduce power consumption, and thereby extend battery life as long as possible. A method and apparatus for polling telephony line status in an integrated services hub to reduce power consumption is disclosed and claimed in co-pending U.S. patent application Ser. No. 09/653,105, filed Aug. 31, 2000, incorporated by reference herein in its entirety.

In order for ISH 10 to communicate with network 30, WAN interface 25 must establish a connection with a network element, such as a service manager, a network server, a network controller, or the like. The procedure for establishing a network connection is dependent on the type of WAN interface. For T1 and ATM (more specifically, ATM-25) the network connection protocol is a simple link-layer protocol utilizing periodic framing signals without training or automatic adaptation. For ADSL and HDSL-2, initial physical and lower protocols (commonly referred to as "handshake and training protocols") are performed. These protocol layers are located on and used by the WAN interface to determine the parameters governing the network connection such as status of the line, data transfer rates, type and speed of equipment on both ends of the line, etc. The WAN interface determines the line condition, and both ends of the link agree on the optimum configuration for those line conditions. Where the network connection is broken, for example by a power cycle or reset of the ISH, a delay is often encountered as a result of running these handshake and training protocols. During this delay in establishing the network connection, telephony services are unavailable even though the ISH is functional. To aid the customer in troubleshooting the system, it is beneficial to inform the customer that telephony functions are unavailable because the network connection is down. Co-pending U.S. application Ser. No. 09/702,933, filed Oct. 31, 2000, incorporated by reference herein in its entirety, provides such information to the customer by checking the status of the network connection and playing an audible warning tone in the telephone receiver if the ISH is not connected to the network.

Once a network connection has been established, the ISH is available to receive incoming telephone calls. A network element (e.g., service manager) sends an incoming call signal to the ISH, which is received by WAN interface 25 and is communicated to ATM control module 55, which in turn communicates the incoming call signal to POTS control module 51. POTS control module 51 receives the incoming call signal (which contains instructions from the service manager identifying correct telephone circuit to receive the incoming call) and routes the signal to the POTS port (i.e., jack), telephone line, and telephones corresponding to the correct telephone circuit.

Figure 1:
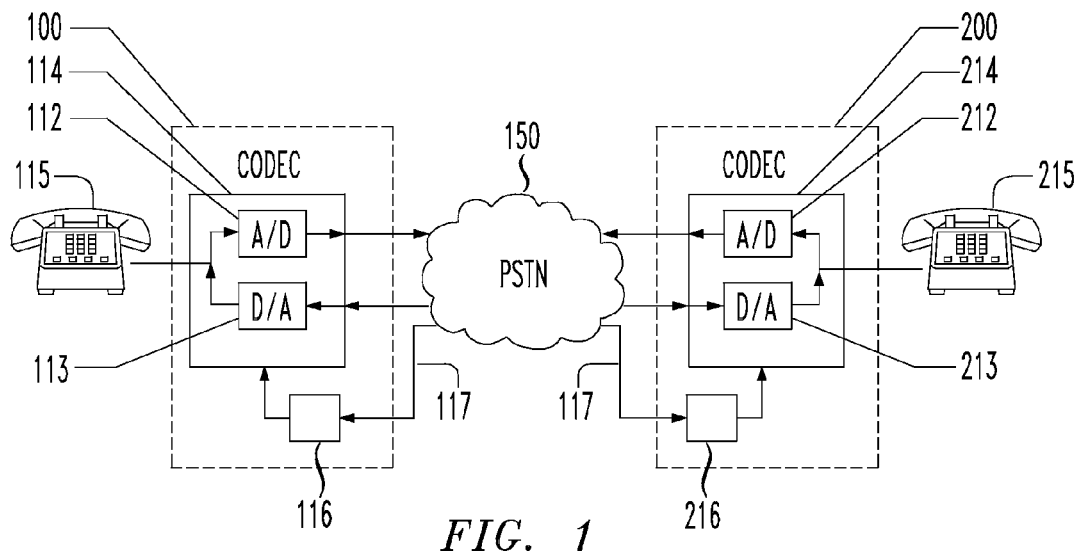
FIG. 1 is a diagram showing extraction of a reference clock from a PSTN network.
Figure 2:
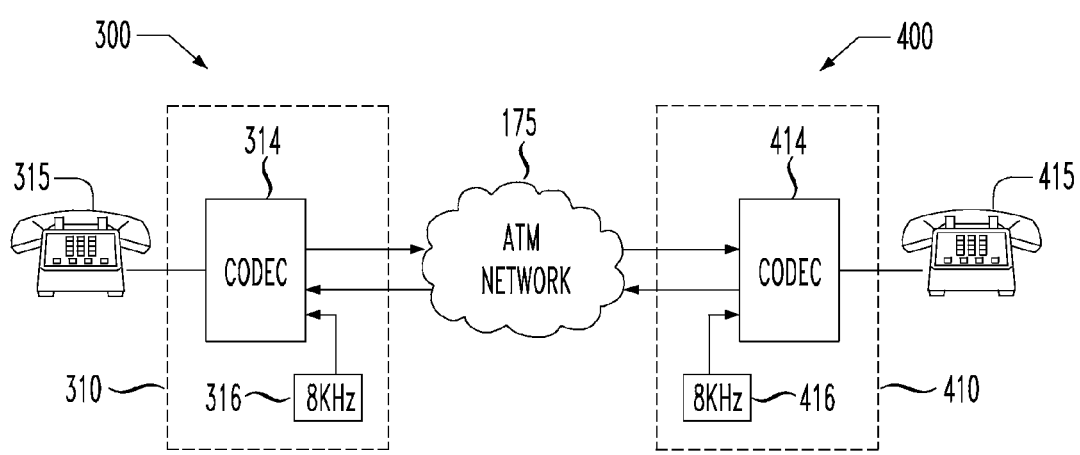
FIG. 2 is a diagram showing use of independent local sampling clocks over an ATM network connection.
Figure 3:
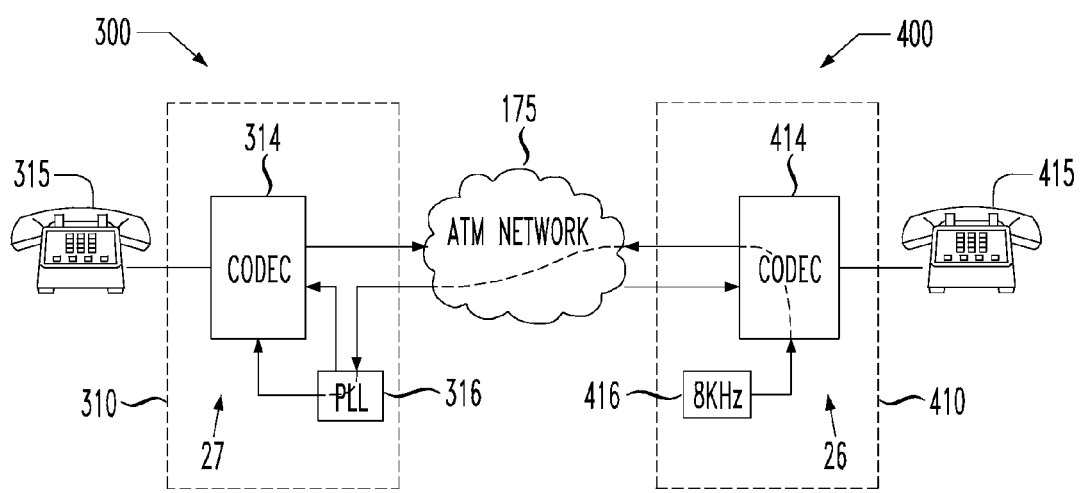
FIG. 3 is a diagram showing linking of a slave sampling clock to a master sampling clock over an ATM network connection.
Figure 5:
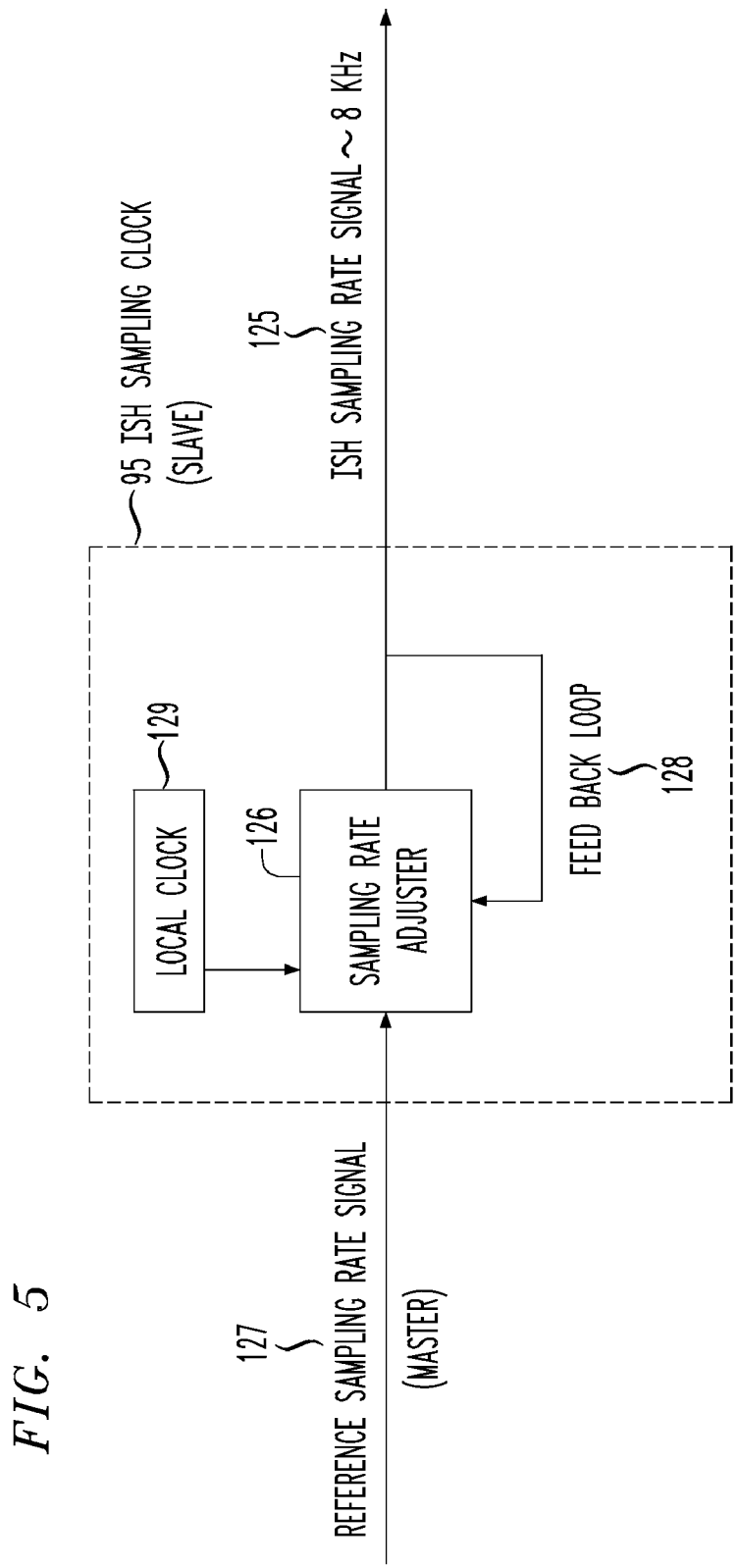
FIG. 5 is a block diagram of a sampling clock housed within an ISH.
Figure 6:
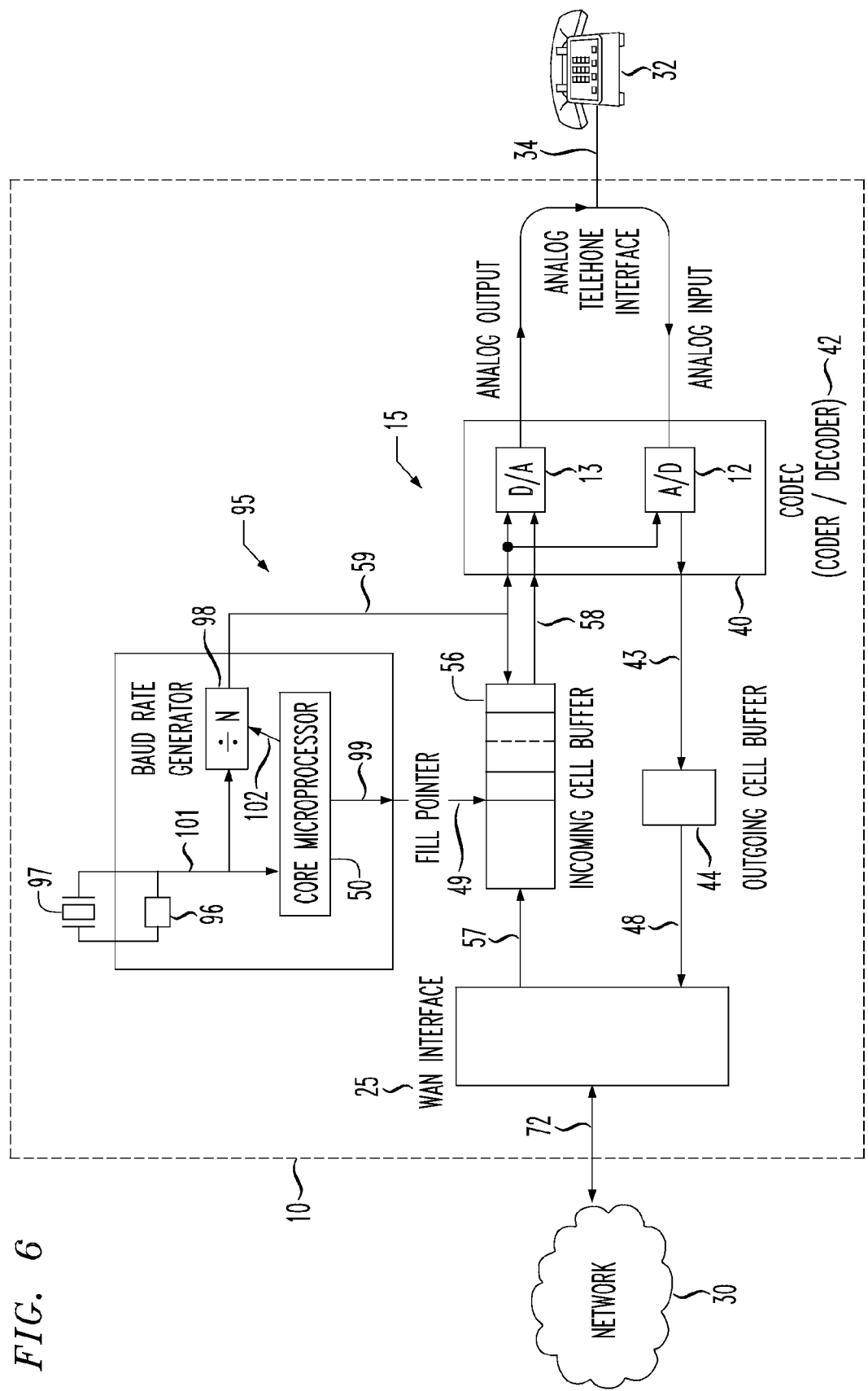
FIG. 6 is a block diagram of the sampling functions within an ISH.

Once a call is connected, ISH 10 both transmits and receives digital signals across the network in order to facilitate contemporaneous communications by a user (e.g., a phone conversation, an on-line chat session, etc.). As discussed previously and shown in FIGS. 2 and 3, an ISH contains a sampling clock that controls the rate of sampling (i.e., coding of the outgoing digital data stream and decoding of the incoming digital data stream), and the ISH sampling clock must be synchronized in order to prevent timing slips. As shown in FIG. 5, ISH sampling clock 95 is synchronized by clock adjuster 126 to reference sampling rate signal 127 by implementing feedback loop 128, whereby ISH sampling clock 95 serves as a slave sampling clock to reference sampling rate signal 127 (i.e., the master) located at the other endpoint of the network connection. Reference sampling rate signal 127 is extracted from the network connection, either directly as an embedded clock or signal (when available, for example, an ADSL timing signal shown in FIG. 7) or extrapolated, for example based upon the arrival rate of digital signals (i.e., samples or cells) to the ISH as shown in FIG. 6 and described infra. Where the reference sampling rate is extrapolated, local clock 129 may be used to generate a baseline clock signal which is adjusted to create the output signal (i.e., ISH sampling rate signal 125) from ISH sampling clock 95. Clock adjuster 126 may be a hardware component such as a voltage-controlled oscillator, or preferably, a software implemented component such as a programmable frequency divider controlled by a microprocessor.

Where a reference clock is not embedded for direct extraction (for example, in a present day ATM network), FIG. 6 shows an embodiment wherein the ISH sampling clock is synchronized by monitoring the arrival rate of cells from the network to the ISH (to extrapolate a reference sampling rate), and adjusting the sampling rate within the ISH to approximate the arrival rate of samples from the network. In other words, the rate at which incoming cells are received by the ISH from the network is monitored, and in turn, the rate of decoding the incoming cells is adjusted to match the rate at which they are received. Likewise, outgoing cells are coded and transmitted from the ISH at approximately the same rate at which incoming cells are received. The result is that within a brief amount of time, the sampling rate within the ISH is fine tuned such that it about equals the sampling rate at the opposite end of the network connection, and thereby the ISH sampling clock (slave) is synchronized with the reference sampling clock (master) at the opposite end of the network connection.

Referring to FIG. 6, CODEC 42 codes analog input received from phone 32 via connection 34 into outgoing digital cells, as depicted in box 12. Preferably, CODEC 42 is a subscriber line access circuit (i.e., SLAC 40 as shown in FIGS. 4 and 6). Outgoing digital cells are placed in outgoing cell buffer 44, which is connected to CODEC 42 by connection 43 and connected to WAN interface 25 by connection 48. When a predetermined number of samples has collected in outgoing cell buffer 44, a cell is packaged and transmitted via WAN interface 25 and connection 72 across network 30. Typically, a sample comprises one byte of information, and a cell comprises 48 bytes of payload. The 48 byte payload of a cell typically further comprises 40 samples (for a total of about 5 milliseconds of voice) and 8 bytes of header information. The header information is used to route the cell from the cell buffer (via the CODEC) to the proper telephone line, thus enabling receipt of cells corresponding to simultaneously occurring telephone calls. This packaging and transmittal of cells across a network is what gives rise to the term "packet" network.

CODEC 42 decodes digital cells, as depicted in box 13, received from network 30 via connection 72 and WAN interface 25 into analog output signals to telephone 32 via connection 34. The incoming cells are placed in incoming cell buffer 56, which is connected to CODEC 42 by connection 58 and connected to WAN interface 25 by connection 57. Cells are transferred from incoming cell buffer 56 to CODEC 42 for decoding on a first in, first out (FIFO) basis. Incoming cell buffer 56 has a fill level indicator 49 that indicates the level of fill within the buffer (i.e., full level meaning that the buffer is filled to capacity with cells, half-full or midpoint level meaning that the buffer is half-filled to capacity with cells, etc.). Incoming cell buffer 56 and outgoing cell buffer 44 preferably comprise portions of the synchronous dynamic random access memory (SDRAM) used by CPU 50, specifically a dynamically linked-list of the cells waiting to be processed. A counter associated with the linked-list keeps track of the number of cells present at any instance. Separate head and tail pointers are maintained such that cells can be put into the linked-list at one end, and removed from the other end in a FIFO fashion.

ISH sampling clock 95 controls the sampling rate within the ISH (i.e., the rate at which cells are transferred from incoming cell buffer 56 and decoded by CODEC 42 and the rate at which cells are coded by CODEC 42 and transferred to outgoing cell buffer 44) by communicating an ISH sampling rate signal to CODEC 42 via connection 59. In the embodiment of FIGS. 4 and 6, a single sampling clock controls the coding and decoding of all calls to and from the ISH, and thus one of the calls provides the timing reference for all active calls.

ISH sampling clock 95 comprises local clock 96, baud rate generator 98, and CPU 50. Local clock 96 generates a baseline clock signal having a baseline clock frequency that is equal to the frequency of the local clock, which may be any reasonable frequency. The baseline clock signal serves as a carrier clock signal, which will be adjusted to create an ISH sampling rate signal. Local clock 96 may be any type of clock suitable for use in customer premises equipment, and may optionally be connected to a backup power supply (such as battery 97) to preserve the clock settings in the event of a primary power failure. A preferred local clock is a clock used to drive the CPU, such as a common crystal oscillator (preferably a 3.3V CMOS oscillator).

Local clock 96 communicates the baseline clock signal to CPU 50 and to baud rate generator 98 via connection 101. CPU 50 adjusts the baseline clock frequency to produce an ISH sampling rate signal that is about equal a predetermined nominal sampling rate, which is preferably 8000 samples per second (i.e., an 8 kHz sampling clock). The ISH sampling rate signal is communicated to incoming cell buffer 56 and CODEC 42 via connection 59, thereby controlling the rate of removal of cells from incoming cell buffer 56 and subsequent decoding of the cells by CODEC 42. CPU 50 may use any suitable means for adjusting the local clock frequency such as a voltage controlled oscillator, or preferably a programmable frequency divider. A preferred embodiment is to divide the local clock frequency by a divisor using a programmable frequency divider. The baseline clock frequency produced by local clock 96 is divided by a divisor to produce an ISH sampling rate signal about equal to the nominal sampling rate (i.e., 8 kHz). CPU 50 calculates the value of the divisor, represented by N, by dividing the baseline clock frequency (in kHz) by the predetermined nominal sampling rate (i.e., 8 kHz). CPU 50 communicates N (the value of the divisor) by connection 102 to baud rate generator 98, which serves as the programmable divider and executes the frequency adjustment by dividing the local clock frequency by the divisor. While any programmable divider may be used to adjust the local clock signal frequency, a preferred programmable divider is a CPU-integrated baud rate generator for supporting serial communications. A preferred baud rate generator is one of the "spare" baud rate generators available on the preferred MPC8260 microprocessor.

Cells are transmitted from the opposite end of the network connection and received into incoming cell buffer 56 at about a constant rate. Since the rate that cells are transmitted from the opposite end of the network (i.e., the reference sampling rate) is directly dependent upon the sampling clock controlling the coding and decoding functions there, it is possible to closely approximate (i.e., extract) the reference sampling rate from the arrival rate of cells into incoming cell buffer 56.

CPU 50 is connected to fill level indicator 49 by connection 99, and thereby monitors the level of cells in incoming cell buffer 56. A preferred fill level indicator is a counter having a baseline equal to the incoming cell buffer midpoint (i.e., the counter is "zeroed" upon the midpoint). As cells are received into the incoming cell buffer, the counter is incremented. Conversely, as cells are removed from the incoming cell buffer and sent to CODEC 42, the counter is decremented. The counter is preferably a counting algorithm executed by the CPU rather than a mechanical counter.

Upon connection of a call and receipt of incoming digital cells, incoming cell buffer 56 is filled to its midpoint. Subsequently, cells are removed from incoming cell buffer 56 and decoded by CODEC 42 at the sampling rate provided by the ISH sampling rate signal communicated over connection 59. If cells are removed from incoming cell buffer 56 and decoded at a rate faster than the arrival rate of cells into incoming cell buffer 56, the fill level (as indicated by fill level indicator 49) will drop below the midpoint. Conversely, if cells are removed from incoming cell buffer 56 and decoded at a rate slower than the arrival rate of cells into incoming cell buffer 56, the fill level (as indicated by fill level indicator 49) will rise above the midpoint.

CPU 50 continuously monitors the fill level, and in response to changes above and below the midpoint, tunes the ISH sampling rate signal (via adjustments to the divisor, N) such that the rate of removal and decoding of cells from incoming cell buffer 56 is about equal to the rate of arrival of cells into incoming cell buffer 56. To increase the ISH sampling rate signal, CPU 50 decreases the value of N sent to baud rate generator 98. Conversely, to decrease the ISH sampling rate signal, CPU 50 increases the value of N sent to baud rate generator 98. In other words, CPU 50 implements a continuous feedback control loop for the duration of the call connection wherein the fill level of incoming cell buffer 56 is continually monitored, and in response changes in the fill level, the ISH sampling rate is continually tuned by increasing or decreasing the value of N sent to the baud rate generator. As with any feedback loop, the ISH sampling rate will oscillate above and below the arrival rate of cells into the incoming cell buffer (as will the fill level in the incoming cell buffer oscillate above and below the midpoint) for a brief period of time and will eventually settle out at about equal to the cell arrival rate. The result is that sampling clock 95 controlling sampling in ISH 10 is effectively synchronized with the sampling clock controlling sampling at the opposite end of the network connection.

A lock range defines the range of frequencies (i.e., the boundaries) of the sampling rate oscillation. The lock range may be defined in software (or firmware) executed by the CPU. For an 8.0 kHz nominal sampling clock, a preferred lock range is between 7.2 kHz and 8.8 kHz. Also, the degree of error correction (in other words, the amount of change to the divisor N) is directly proportional to the size of the error difference (i.e., the oscillation jitter) between the sampling clock and the extracted reference clock as indicated by cell buffer fill level. A small variation in the cell buffer fill level from its midpoint results in a small degree of error correction, while a large variation in the cell buffer level from its midpoint (i.e., as the fill level nears a maximum or minimum level) results in a large degree of error correction.

In the embodiment shown in FIG. 6, synchronization of sampling clock 95 is calculated based upon the arrival rate of cells to the ISH. Thus, sampling clock 95 residing within the ISH should be capable of synchronization without regard to the specifics of the network connection extending beyond the ISH itself such as the network backbone structure and routing (e.g., a 100 percent ATM network connection, an ATM/PSTN hybrid connection, etc.), how and where the coding and decoding functions are performed, the specific type of opposite endpoint sampling clock, etc.

Figure 7:
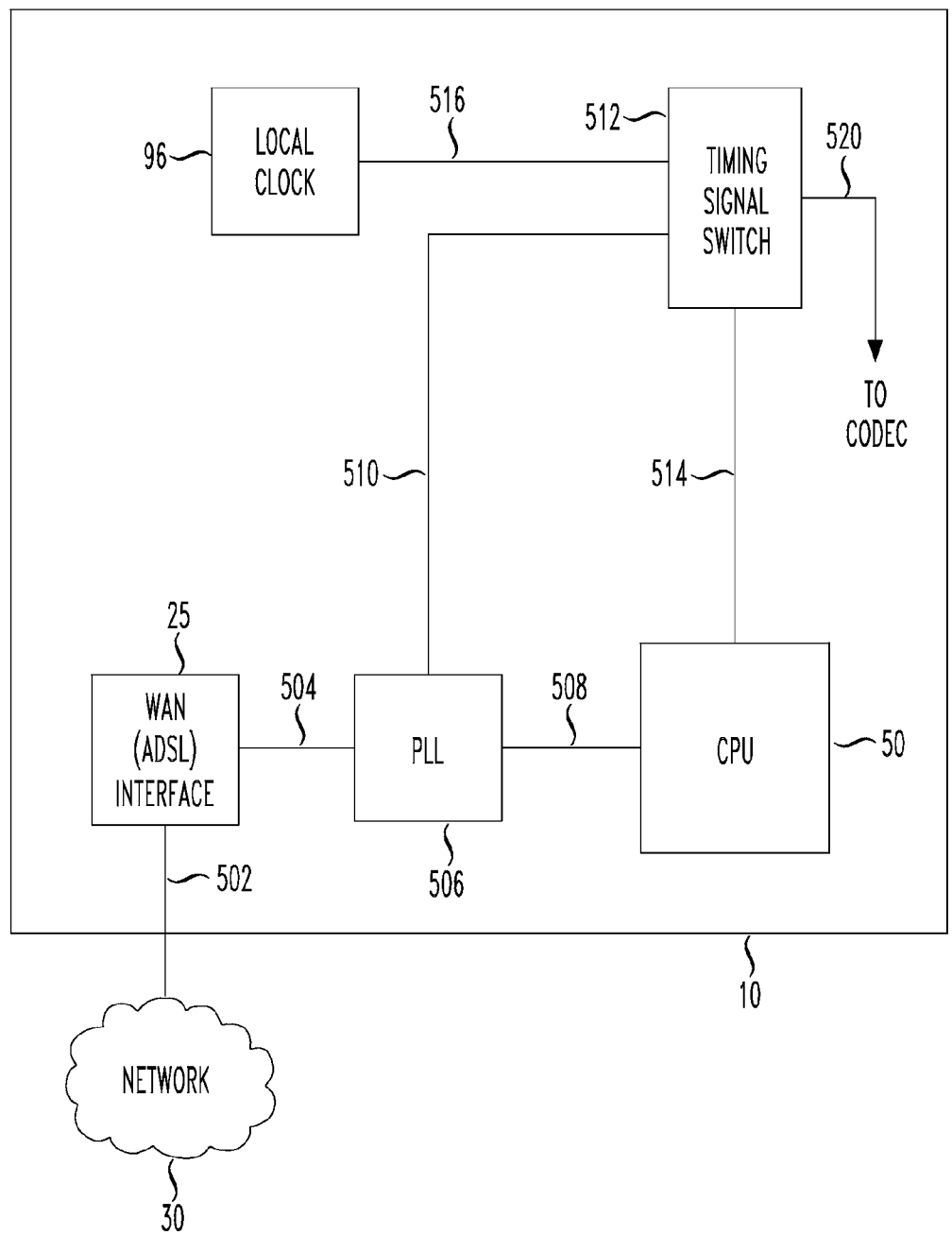
FIG. 7 is a block diagram showing the use of an ADSL and PLL to generate a sampling clock signal.

Another embodiment of the present invention is shown in FIG. 7. The components depicted in FIG. 7 are preferably present within the ISH 10 but may be incorporated into other types of equipment such as a computing system. Network 30 is connected to ISH 10 by a local access loop 502. In a preferred embodiment, local access loop 502 is xDSL and more preferably ADSL. The ADSL line 502 is connected to WAN interface 25 which is preferably an xDSL interface and more preferably an ADSL interface. A timing signal is typically present on local access loop connections and is accessible via WAN interface 25. WAN interface 25 extracts the embedded timing signal and outputs an 8 KHz timing reference signal onto connection 504. A phase-locked loop (PLL) device 506 is connected to WAN interface 25 by connection 504. A preferred PLL device is a 74HC4046A available from Philips. The PLL 506 adjusts the 8 kHz signal coming from the WAN interface 25 to a different frequency, for example about 2.048 MHz. The adjusted timing signal is sent via connections 508 and 510 to the CPU 50 and to a timing signal switch 512, respectively. The CPU 50 measures one period of the adjusted timing signal and uses the period to calculate the frequency of the adjusted timing signal. The calculated frequency is then compared to a predetermined standard. If the frequency is within a predetermined range above or below the standard, the CPU 50, via connection 514, causes timing signal switch 512 to enter into a first of two possible states. In this state, the timing signal switch 512 accepts the adjusted timing signal from connection 510 and relays the adjusted timing signal to the CODEC (not shown) via connection 520, where the adjusted timing signal serves as the ISH sampling rate. If the frequency is not within the predetermined range, the CPU 50, via connection 514, causes timing signal switch 512 to enter a second of the two possible states. In this state, timing signal switch 512 relays to the CODEC (not shown) a fallback timing signal (as discussed below) via connection 520, where the fallback timing signal serves as the ISH sampling rate.

Timing signal switch 512 has three inputs, connection 514 from CPU 50, connection 510 from PLL 506, and connection 516 from a local clock 96 of the type present within the ISH 10 described previously. The switch 512 has one output 520 connected to a CODEC (e.g., the SLAC 40 in FIG. 4 or the CODEC 42 in FIG. 6). In the embodiment of FIG. 7, the local clock 96 preferably has a frequency of 2.048 MHz with a tolerance of approximately plus or minus 25 parts per million. The local clock 96 is used to provide a fallback timing reference when the frequency of the adjusted timing signal provided by the PLL 506 is not within the specified tolerance as measured by the CPU 50 or when an embedded timing signal cannot be extracted from the local access loop via the WAN interface 25. Since the accuracy of this local clock 96 is typically not as great as that of the adjusted timing signal coming from the PLL 506, it is preferred that the adjusted timing signal be used.

After the CPU 50 determines whether the adjusted timing signal it receives from the PLL 506 is within the predetermined range, it sends an appropriate message to the timing signal switch 512 by means of connection 514. Based on the status of the information sent by the CPU 50 via connection 514, timing signal switch 512 relays the ISH sampling rate to the CODEC (not shown) by entering into the appropriate first or second state to connect either the adjusted timing signal from the PLL 506 or the fallback timing signal from the local clock 96 to the output connection 520 connected to the CODEC. If the CPU 50 determines that adjusted timing signal is within the specified tolerance, it causes timing signal switch 512 to enter into the first state, which connects the adjusted timing signal to output connection 520. If the CPU 50 determines that the adjusted timing signal is not within the specified tolerance, it causes timing signal switch 512 to enter into the second state, which connects the fallback signal from internal clock 96 to output connection 520.

In the embodiment shown in FIG. 7, the local clock 96 is used to synchronize data transfers when an embedded timing signal is not available on the local access loop, or when the adjusted timing signal provided by the PLL 506 is not within the acceptable range of frequencies. Timing slips are more likely to occur when the signal from the local clock 96 rather than the adjusted timing signal is placed on output 520. To minimize the possibility of timing slips in this situation, a buffering system such as that described above and shown in FIG. 6 can be combined with the embodiment shown in FIG. 7. In this alternative embodiment, the method and apparatus of adjusting the data transfer rate based on the amount of data in a buffer block can be used in conjunction with the local clock 96 to increase the level of synchronization between two network endpoints where an ADSL timing signal is not available or is not within the acceptable range.

What is claimed is:

1. A method for synchronizing the rate of data transfer between two endpoints of a computer network comprising:
    extracting a timing signal from a local access loop of a network;
    generating an adjusted timing signal through the use of a phase-locked loop (PLL) to modify the frequency of the timing signal extracted from the local access loop;
    comparing the frequency of the adjusted timing signal to a predetermined value;
    selecting the adjusted timing signal when the frequency of the adjusted timing signal falls within a predetermined range around the predetermined value;
    selecting a fallback timing signal generated by a local clock when the frequency of the adjusted timing signal falls outside the predetermined range around the predetermined value; and
    using the selected timing signal to synchronize the rate of data transfer.

2. The method of claim 1 wherein the local access loop is selected from a group consisting of ADSL, U-ADSL, SDSL, HDSL2, RADSL, T1, cable modem, wireless broadband modem, and ATM-25.

3. The method of claim 1, wherein the selected timing signal is the fallback timing signal, further comprising:
    monitoring the fill level of incoming cells received into an incoming cell buffer;
    increasing the frequency of the fallback timing signal in response to an increase in the fill level of the incoming cell buffer above the midpoint; and
    decreasing the frequency of the fallback timing signal in response to a decrease in the fill level of the incoming cell buffer below the midpoint.

4. The method of claim 3 wherein the local access loop is selected from a group consisting of ADSL, U-ADSL, SDSL, HDSL2, RADSL, T1, cable modem, wireless broadband modem, and ATM-25.

5. The method of claim 1 wherein the data transfer rate synchronization occurs within an integrated services hub or a computing system.

6. The method of claim 3 wherein the data transfer rate synchronization occurs within an integrated services hub or a computing system.

7. An apparatus for synchronizing the rate of data transfer between two endpoints of a computer network comprising:
    a network interface connected to a local access loop of a network to extract a timing signal from the local access loop;
    a PLL connected to the network interface to receive the timing signal and generate an adjusted timing signal;
    a comparator connected to the PLL to receive the adjusted timing signal and compare the adjusted timing signal to a predetermined value, the comparator further connected to a switch to control the output of the switch based on the results of the comparison; and
    a local clock connected to the switch to provide a fallback timing signal when the frequency of the adjusted timing signal falls outside a predetermined range around the predetermined value, wherein the switch is controlled by the comparator to select between the adjusted timing signal and the fallback timing signal and place the selected signal on an output.

8. The apparatus of claim 7 wherein the local access loop is selected from a group consisting of ADSL, U-ADSL, SDSL, HDSL2, RADSL, T1, cable modem, wireless broadband modem, and ATM-25.

9. The apparatus of claim 7 wherein the output is connected to a CODEC.

10. The apparatus of claim 7 further comprising:
    an incoming cell buffer to receive incoming cells;
    a fill level indicator connected to the incoming cell buffer to monitor the fill level of the incoming cell buffer; and
    a frequency adjuster connected to the fill level indicator and the local clock to increase the frequency of the fallback timing signal in response to an increase in the fill level of the incoming cell buffer above the midpoint and decrease the frequency of the fallback timing signal in response to a decrease in the fill level of the incoming cell buffer below the midpoint.

11. The apparatus of claim 10 wherein the local access loop is selected from a group consisting of ADSL, U-ADSL, SDSL, HDSL2, RADSL, T1, cable modem, wireless broadband modem, and ATM-25.

12. The apparatus of claim 10 wherein the output is connected to a CODEC.

13. The apparatus of claim 7 comprised within an integrated services hub or a computing system.

14. The apparatus of claim 10 comprised within an integrated services hub or a computing system.

* * * * *